(12) United States Patent
O'Neil

(10) Patent No.: US 9,079,628 B2
(45) Date of Patent: Jul. 14, 2015

(54) SPRING ASSISTED JUMPING BICYCLE

(71) Applicant: David O'Neil, Greenacres, FL (US)

(72) Inventor: David O'Neil, Greenacres, FL (US)

(*) Notice: Subject to any disclaimer, the term of this patent is extended or adjusted under 35 U.S.C. 154(b) by 64 days.

(21) Appl. No.: 14/033,614

(22) Filed: Sep. 23, 2013

(65) Prior Publication Data

US 2015/0084306 A1    Mar. 26, 2015

(51) Int. Cl.
| | |
|---|---|
| *B62K 21/02* | (2006.01) |
| *B62K 3/02* | (2006.01) |
| *B62K 25/04* | (2006.01) |
| *B62K 25/12* | (2006.01) |

(52) U.S. Cl.
CPC . *B62K 3/02* (2013.01); *B62K 21/02* (2013.01); *B62K 25/04* (2013.01); *B62K 25/12* (2013.01)

(58) Field of Classification Search
CPC .. B62K 2025/042; B62K 21/00; B62K 21/02; B62K 21/04; B62K 25/00; B62K 25/04; B62K 25/06; B62K 25/12
USPC .............. 280/275, 276, 277, 279, 280, 281.1, 280/283, 284, 288
See application file for complete search history.

(56) References Cited

U.S. PATENT DOCUMENTS

| | | | |
|---|---|---|---|
| 974,365 A * | 11/1910 | Draper | 280/277 |
| 3,694,004 A * | 9/1972 | Siebers | 280/277 |
| 3,964,765 A * | 6/1976 | Zenser | 280/284 |
| 4,400,003 A | 8/1983 | de la Haye | |
| 4,789,174 A * | 12/1988 | Lawwill | 280/284 |
| 5,052,706 A | 10/1991 | Tsai et al. | |
| 5,301,969 A | 4/1994 | Bynoe | |
| 5,405,159 A * | 4/1995 | Klein et al. | 280/283 |
| 5,522,610 A * | 6/1996 | Teel, Sr. | 280/276 |
| 5,580,075 A * | 12/1996 | Turner et al. | 280/276 |
| 5,658,001 A | 8/1997 | Blanchard | |
| 5,833,258 A * | 11/1998 | Maestripieri | 280/275 |
| 5,992,870 A * | 11/1999 | LaRiviere | 280/276 |
| 6,209,899 B1 | 4/2001 | O'Neil | |
| 6,220,614 B1 | 4/2001 | O'Neil | |
| 6,450,520 B1 * | 9/2002 | Girard | 280/284 |
| 6,558,297 B1 | 5/2003 | Brown, Jr. et al. | |
| 2008/0067772 A1 * | 3/2008 | Weagle | 280/124.134 |
| 2012/0146311 A1 * | 6/2012 | Williams | 280/276 |

\* cited by examiner

*Primary Examiner* — Joseph Rocca
*Assistant Examiner* — Marc A Scharich
(74) *Attorney, Agent, or Firm* — McHale & Slavin, P.A.

(57) ABSTRACT

The present invention is a bicycle having a frame capable of flexing under downward force so that when downward force is applied a front spring assembly and a rear spring assembly are able to store and release the energy allowing the bike to jump in the air. The spring assemblies of the present invention use bow springs made from fiberglass/epoxy, graphite/epoxy, or fiberglass/nylon instead of traditional coil springs. The bow springs allow the spring assemblies to return a greater amount of energy than their coil spring counterparts while keeping overall weight of the spring assembly down.

15 Claims, 7 Drawing Sheets

SPRING ASSISTED JUMPING BICYCLE

FIELD OF THE INVENTION

The invention is directed to improvements in bicycles, and in particular, to a bicycle having a rider actuated jumping mechanism.

BACKGROUND OF THE INVENTION

Bicycles are a popular and efficient form of transportation which allows riders to travel over long distances with relative ease. Bicycles are also environmentally friendly and allow riders to exercise while they travel. As bicycle designs have progressed, numerous improvements have been implemented to enhance various aspects of bicycle performance.

Some modifications, like multi-gear drive systems, make bicycles easier to operate over hills and during periods of heavy wind. Additionally, new seat designs have made bicycles more comfortable, increasing the distance they may be ridden. Some bicycles, like recumbants, even allow riders to assume a reclined orientation during travel. Other bicycles include provisions to accommodate more than one rider simultaneously. Still other bicycles, like those of U.S. Pat. Nos. 4,400,003 and 5,052,706 have components that are selectively collapsible to promote easy storage and safe shipping.

In addition to providing a practical means of transportation and a convenient source of exercise, bicycles are often used as a source of entertainment. For example, many riders explore rocky terrain on so-called "mountain bikes." This type of bicycle typically includes a shock absorbing suspension system that improves control over uneven surfaces. Suspension systems reduce rider fatigue by absorbing impacts that would otherwise be transmitted directly to the rider. An example of a suspension-including bicycle is disclosed in U.S. Pat. No. 5,658,001.

Mountainous terrain is not the only location traversed by thrill-seeking bicycle riders, however. Many riders choose the bicycle as a means of simulating temporary flight. Typically, this flight experience involves riding a bicycle at a high speed up, onto, and over an inclined ramp. With a ramp jump, the bicycle's momentum carries the bicycle and rider through the air. Other riders, such as those riding on mountainous terrain, will ride down large hills and jump off ledges as they go. Some city riders will ride around city streets jumping off of, and over, any obstacles they encounter as they ride.

But not all riders have access to ramps or mountains to ride on, but still want the thrill of jumping their bicycles as they ride. While city funded, or private, ramp parks are developing in certain areas, there are heavy constraints on access for riders. Alternatively, if a rider wanted to build their own ramp park they would not only need the space to build it, but also have the money to buy or build the ramps, which can be a prohibitively expensive cost. Using a mountain trail or a city street for recreational jumping is more cost effective, but comes with other restraints. Not all areas have easy access to mountain trails, or even any access. Even when accessible, mountain trails require maintenance or use and weather can lead to their eventual destruction. City streets are often convenient for riders, but the added risks of cars that might hit the rider, or pedestrians that the rider might hit make the liability of trick riding and jumping in these areas prohibitive. These constraints are limiting, and prevent a rider from the thrill and enjoyment of jumping their bike at any and all times, even as they commute from one place to another.

U.S. Pat. No. 5,301,969 is one known disclosure that provides a dual frame bicycle for purposed of jump simulation. The bicycle converts rotational energy from the bicycle wheel into translational energy used to make the bicycle leap. The '969 device is formed from two frames and employs a hooked pole that selectively engages a pin affixed to the bicycle rear wheel. The two bicycle frames are spaced apart by elastic members, and using the hooked pole to engage the rear wheel pin draws the two frames together, storing potential energy in the elastic members. The pole remains hooked to the wheel pin until the wheel has rotated a predetermined distance, at which point the hook is released. When the hook is released, the energy stored in the elastic members is released, forcing the bicycle frames apart and causing the bicycle to jump. The '969 patent requires a two frame and complex construction that is cost prohibitive and, once the bicycle begins to store energy, a jump is unavoidable. Even if it were possible to wrench the hook free from the wheel pin before the wheel had rotated through the hook-releasing distance, the already-stored energy would still be released. As a result, a rider attempting to abort a jump will still be lifted before coming to rest. This design also makes it difficult for a rider to increase or decrease the amount of lift, as needed. The '969 device also produces consistent amounts of lift which may not be appropriate for all situations during a given bicycle ride.

U.S. Pat. No. 6,558,297 discloses a locomotive device, such as a pogo stick, using a bow spring as the energy storage device. The bow spring in the form of a high-performance composite spring material such as fiberglass/epoxy or graphite/epoxy capable of storing at least two times more energy than a conventional steel coil spring having the same weight. The device uses a roller to guide a plunger to further improve the overall efficiency and performance of the device.

Applicant's U.S. Pat. Nos. 6,209,899 and 6,220,614 disclose bicycles having energy conversion construction that permits a rider to selectively elevate a bicycle frame during operation. A positioning systems convert's rotational energy from one of the wheels into translational energy causing the frame to elevate.

Accordingly, a need exists to provide a system that allows a user to jump their bicycle at any and all times that a rider chooses. A system which allows a bicycle rider to enjoy the thrilling stunt activities of jumping a bike on any terrain, including flat ground, while still providing the energy efficient, environmentally friendly exercise and transportation features of a traditional bicycle.

SUMMARY OF THE INVENTION

The present invention discloses a bicycle having a two-piece hinged frame with front and rear bow springs so a rider can store spring potential energy which, when released, allows the bicycle and rider to jump into the air. In operation, the spring assisted jumping bicycle can operate similarly to a conventional bicycle. The rider can pedal the bicycle for efficient transportation by alternately pressing the pedals which cause a chain drive operation to turn a rear cog secured to a wheel producing forward motion. When desired, the rider is capable of jumping the bicycle by "pumping" wherein the individual drops their center of gravity using both the bicycles pedals and handlebars causing the bike's center of gravity to drop. The drop in the center of gravity for the system creates potential energy in the bow springs. Once the energy is released the bike springs upward in direct response to the amount of energy stored and now released. A rider can "pump" the bike in order to make the bike jump while moving or while at a standstill. Additionally, a rider can ride off of an elevated surface so that when the bike lands, the larger drop in energy is stored in the springs and therefore a higher jump can be achieved.

It is an objective of the instant invention to provide a bicycle which can jump in place or while moving.

It is a still further objective of the instant invention to provide a bicycle with a shock system which returns the spring potential energy instead of dampening and dissipating it.

It is an objective of the instant invention to provide a bicycle which can be ridden normally when desired, or used for tricks and entertainment without requiring any conversion.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
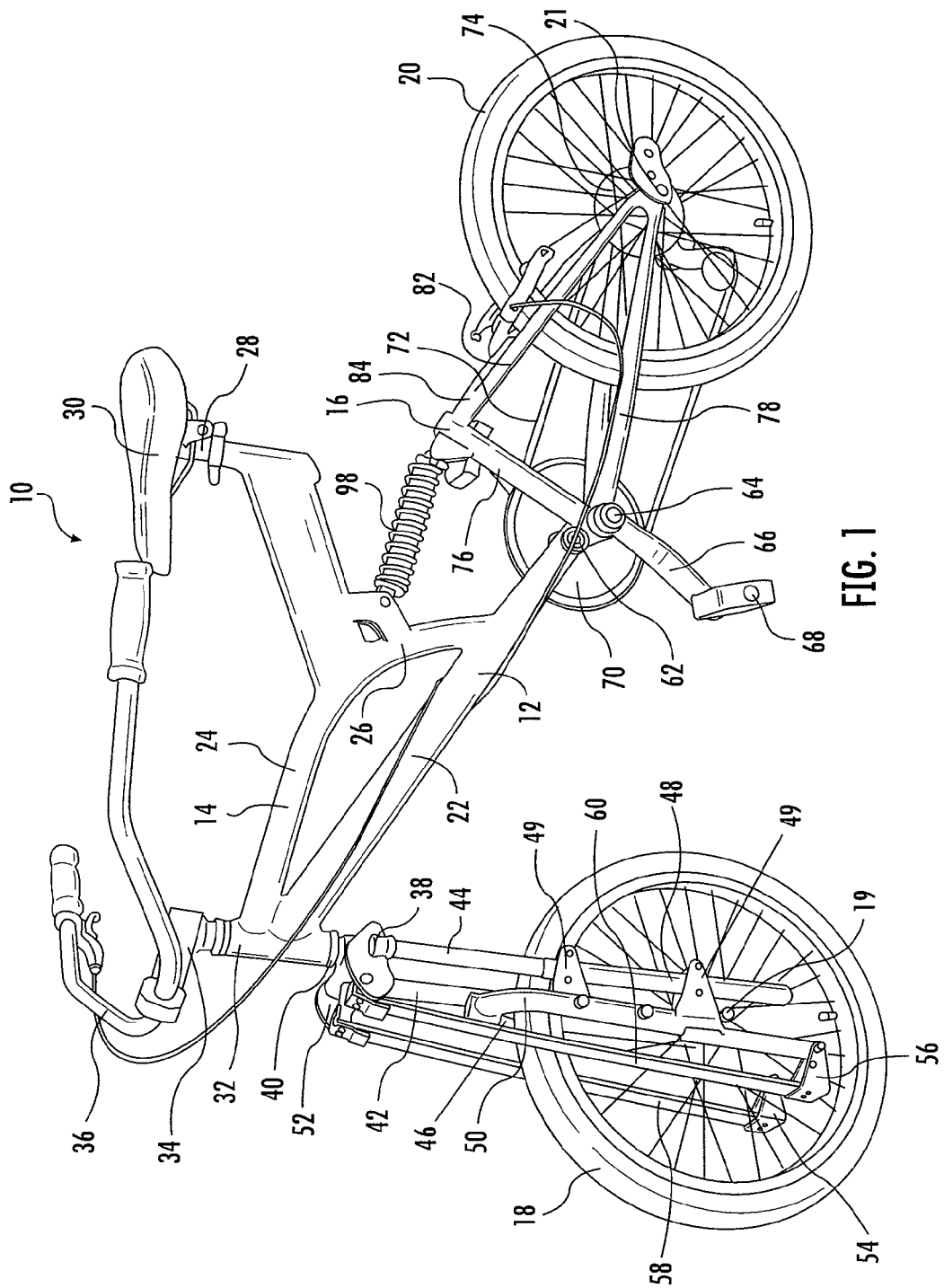
FIG. 1 is a side perspective view of a spring assisted jumping bicycle.

Illustrated generally in the figures are different embodiments of the present invention. Shown here is a spring assisted jumping bicycle (10), having a frame (12), a front wheel (18) with a front axle (19), a rear wheel (20) with a rear axle (21), a seat (30), handlebars (36), and pedals (68). Like any other conventional bicycle, a rider must press down on the pedals (68) which move the pedal crank arms (66) on the pedal axle (64) which, turn the chain ring (70) and the chain (72) which in turn turns the rear cogs (74) causing the rear wheel (20) rotate and make the bicycle move forward. Shown in the figures is a bicycle with multiple gears which would require derailleurs for the front chain ring and rear cogs, but other embodiments include a single front chain ring and rear cog which allows for a more simple design. If the pedal bearings are concentric with the rear frame pivot point, the chain does not need a derailleur-type tensioner. Additionally, brakes can be incorporated in a variety of ways, including brake calipers, disc brakes, and coaster brakes.

The frame includes a front section (14) and a rear section (16) attached by a pivot point (62) which allows the frame (12) to flex. The frame includes a down tube (22) and a top tube (24) joined by a head tube (32). A support tube (26) can be included as shown to support the top tube (24) along the down tube (22) between the head tube (32) and the seat (30), which attaches with a seat post (28). The head tube (32) provides a sleeve for the steering tube (40) of the fork (38). A stem (34) is attached to the steering tube (40) on the top of the head tube (32) and connects the steering tube (40) to the handlebars (36). This allows a rider to turn the steering tube (40) by turning the handlebars (36).

Extending below the head tube (32), the fork (38) connects down to the front wheel (18), attaching to the front axle (19). In one embodiment, the fork includes an upper fork bracket (52) below the head tube (32), a right fork tube (42) and a left fork tube (44) which stays fixed to the bike frame, a lower right tube (46) and a lower left tube (48). The upper and lower tubes on each side are slideably connected so that together they form an expandable support on each side. A support arc (50), connecting the lower right and lower left tubes (46, 48), can be included as an additional piece or incorporated into the fork (38) design to add support to the fork (38) ensuring the fork (38) can handle the stress of the spring assisted jumping bicycle (10). At the bottom end of the right lower tube is a right front bracket (54) and at the bottom end of the left lower tube (48) is a left front bracket (56). The right and left front brackets (54, 56) and the upper fork bracket (52) work in combination to hold a right front spring (58) and a left front spring (60), where the right front spring (58) is held at the top by the upper fork bracket (52) and at the bottom by the right front bracket (54) and the left front spring (60) is held at the top by the upper fork bracket (52) and at the bottom by the left front bracket (56). Preferably, the springs are bow springs made of fiberglass/epoxy, graphite/epoxy, or fiberglass/nylon. With the spring fully straightened, the right and left fork tubes (42, 44) and lower right and left tubes (46, 48) form expandable supports that are effectively fully expanded. As the expandable supports contract under a force, the contraction of the expandable supports causes the spring to contract and store spring potential energy. Removal of the force causes the spring to release the stored energy. The use of bow springs instead of traditional coil springs allows for far greater energy return in the spring assembly.

Figure 2:
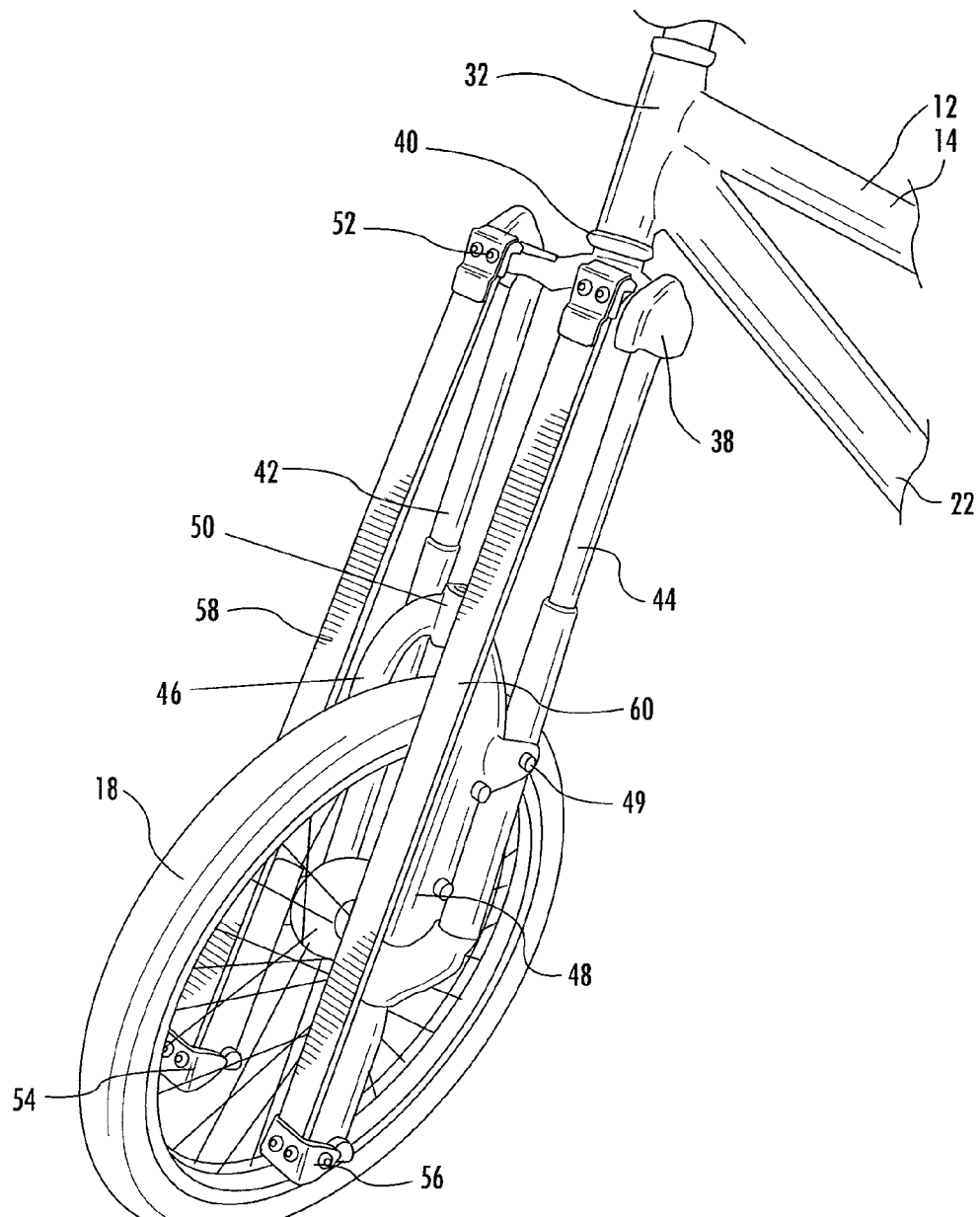
FIG. 2 is a perspective view of the fork of a spring assisted jumping bicycle.
Figure 3:
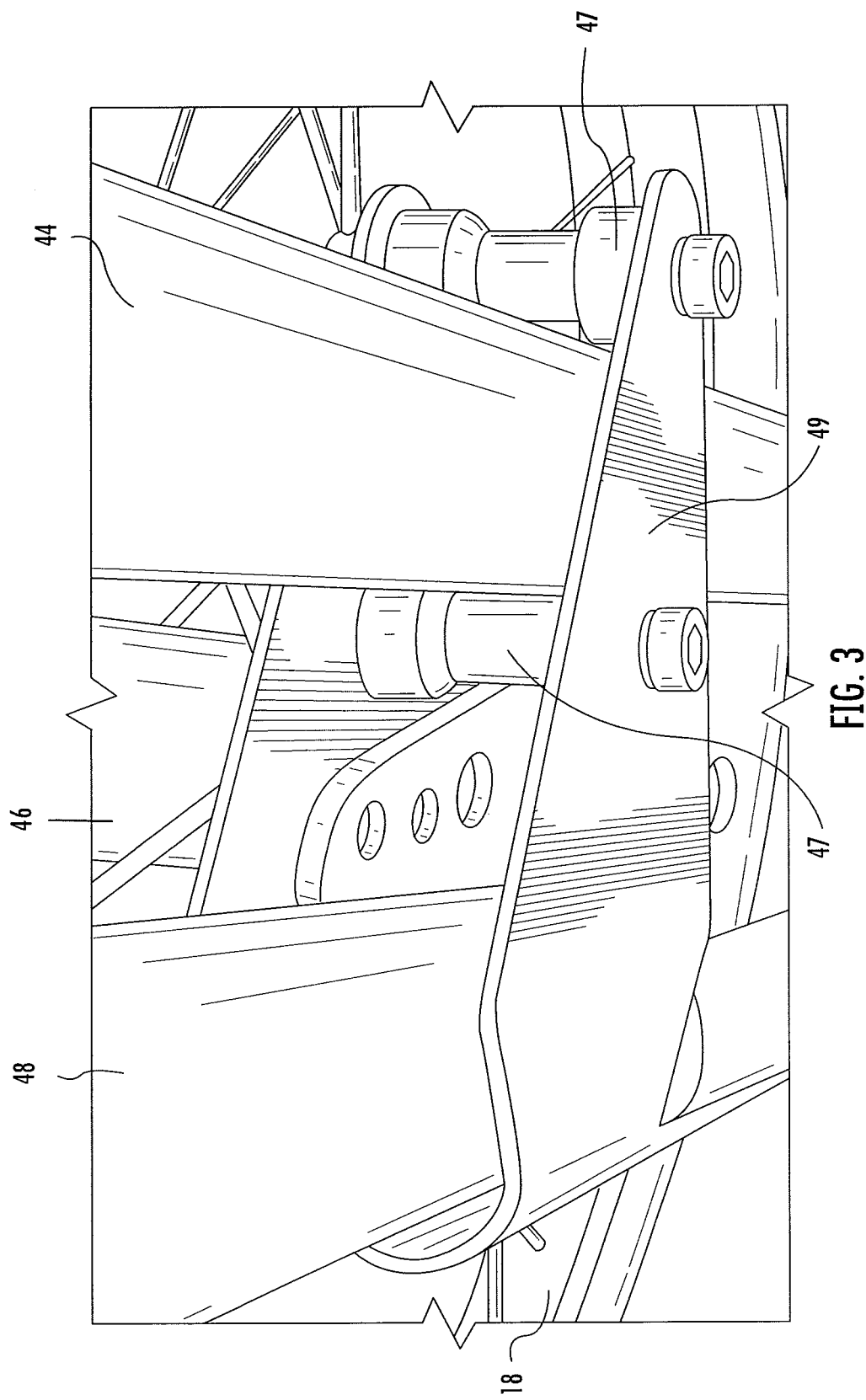
FIG. 3 is a top perspective view of a roller bracket and rollers on the fork.

In a further embodiment of the fork (38), as seen in FIGS. 1 and 2, extending down from the head tube (32) is a right fork tube (42) and a left fork tube (44). The right and left front springs (58, 60) are connected to the fork (38) at the upper fork bracket (52) at the top, and to a slideable arc at the bottom. The slideable arc, including the lower right tube (46) and the lower left tube (48), is attached to the front wheel (18) at the front axle (19) and connected to the right and left fork tubes (42, 44) using rollers (47) and roller brackets (49). Shown in greater detail in FIG. 3, each fork tube has two fork brackets (49), and each fork bracket (49) has two rollers (47), holding the fork tube between them. This allows the slideable arc to move up and down the fork tubes causing the right and left front springs (58, 60) to flex and store energy, then return that energy for a jump.

Figure 4:
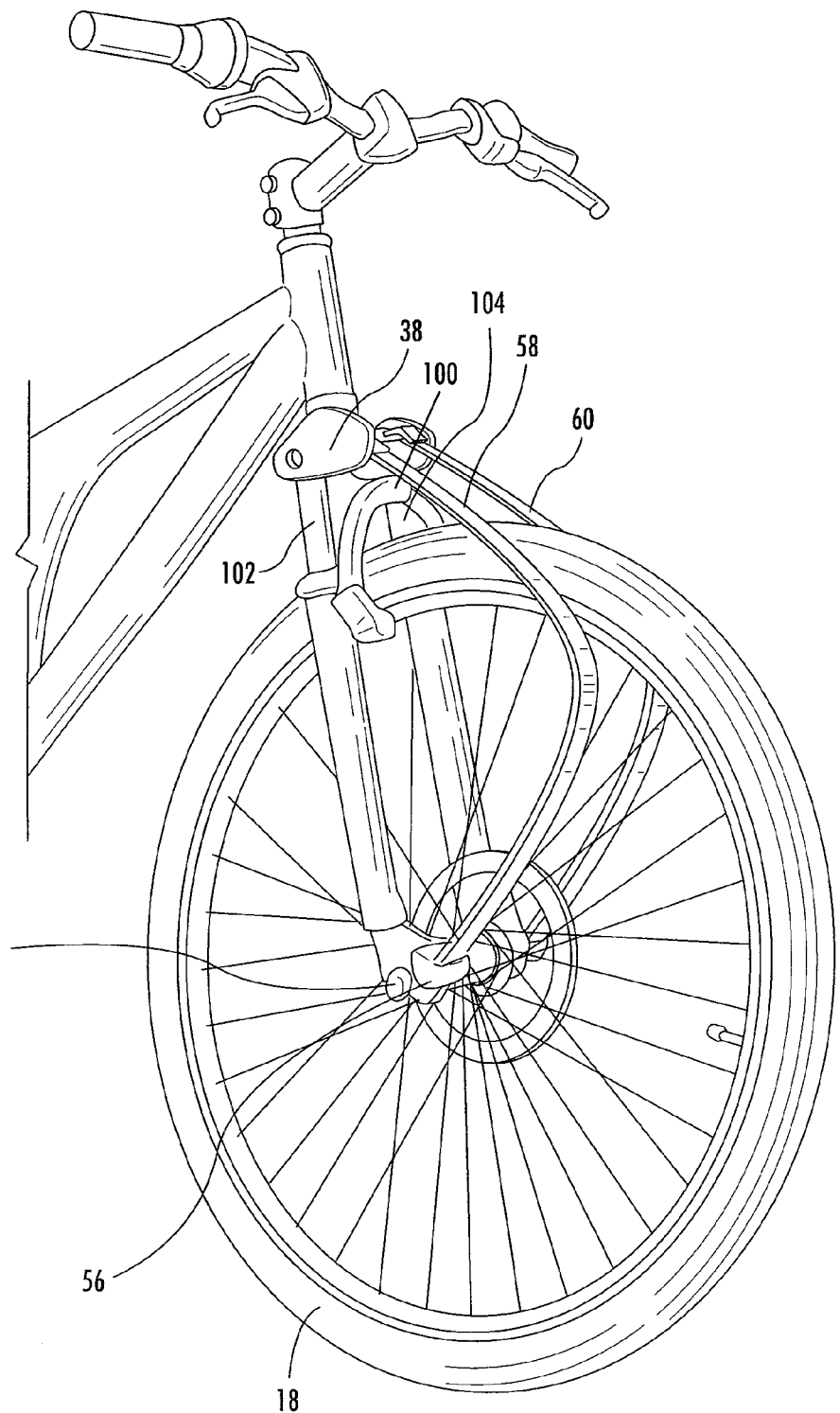
FIG. 4 is a perspective view of the fork of a preferred embodiment of the spring assisted lumping bicycle using a simplified slideable tube.
Figure 5:
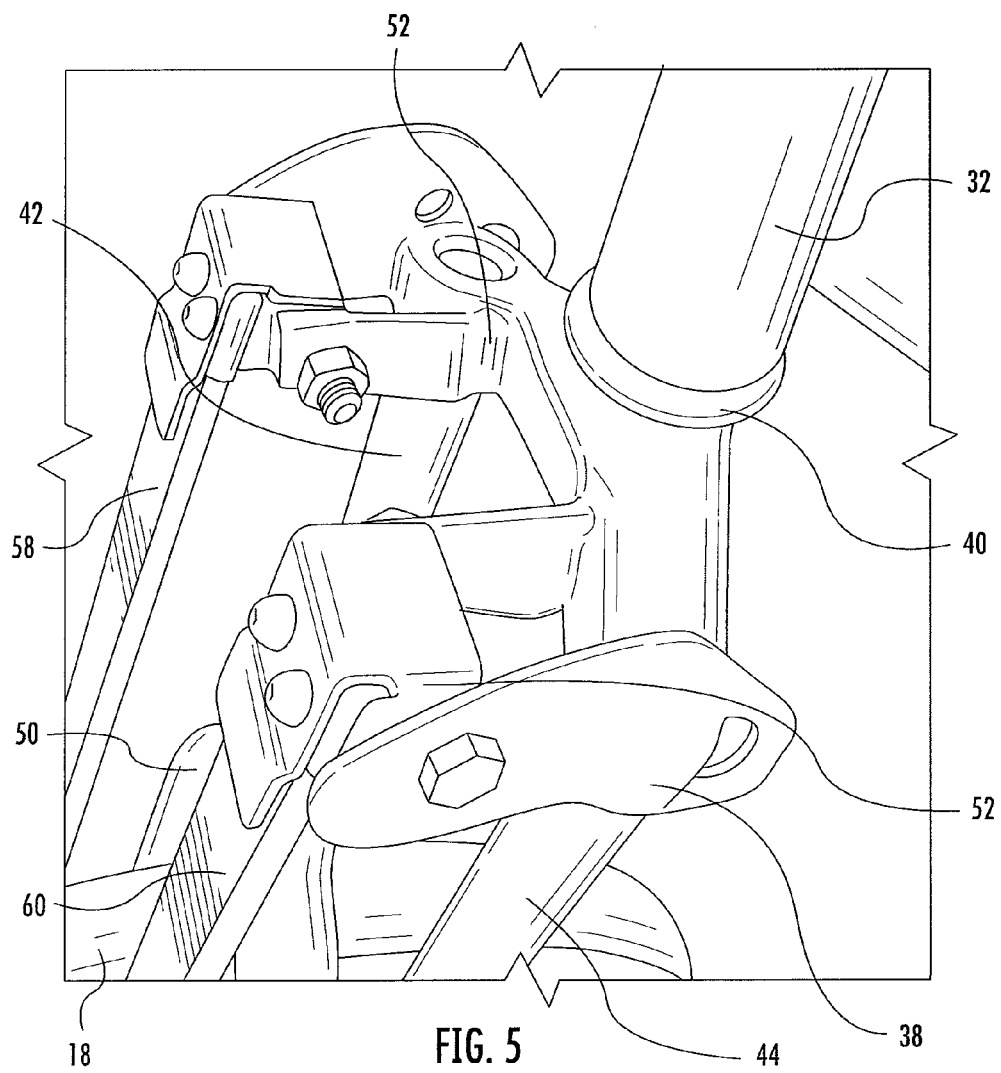
FIG. 5 is a top perspective view of the upper fork bracket.
Figure 6:
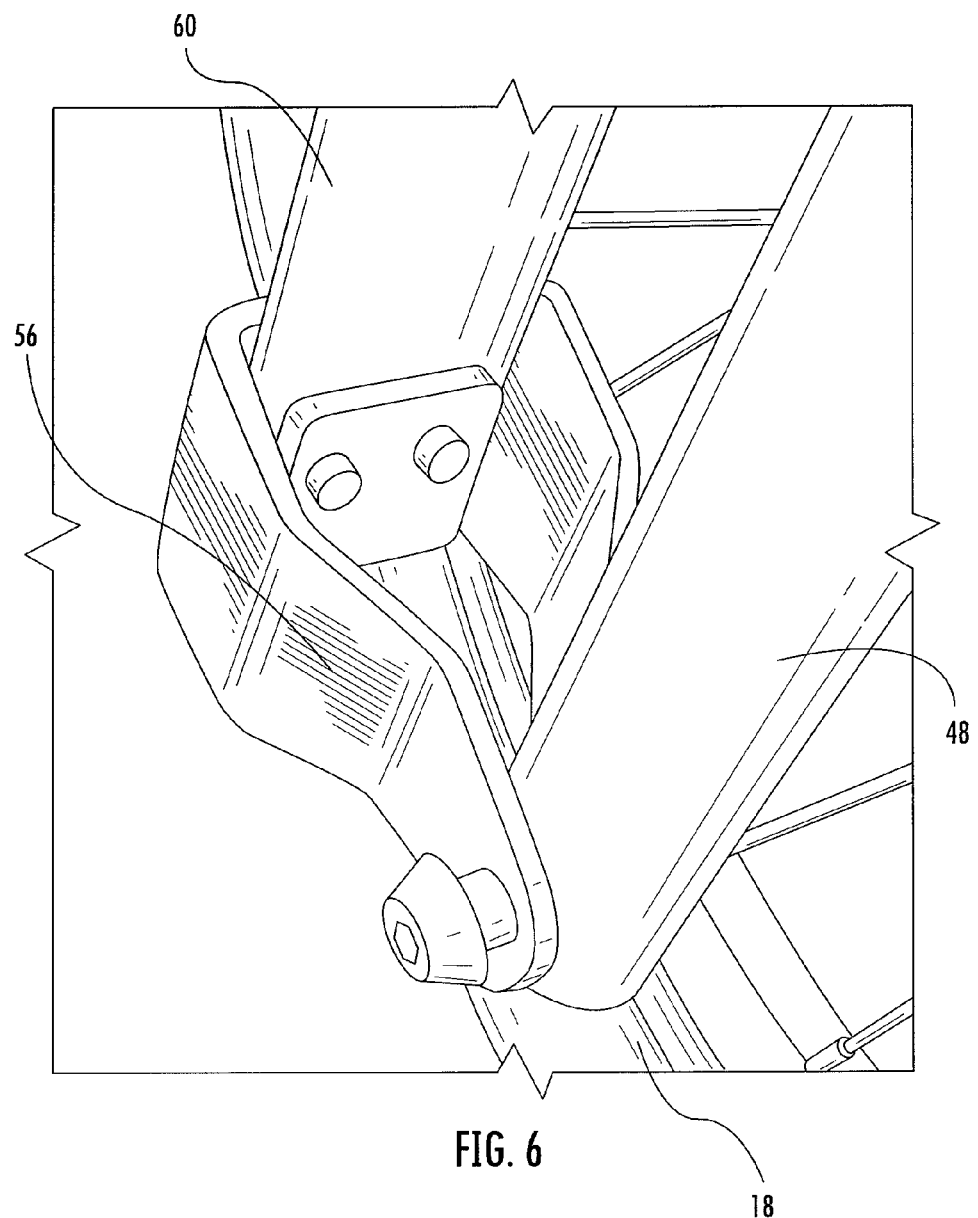
FIG. 6 is a perspective view of the left front bracket.
Figure 7:
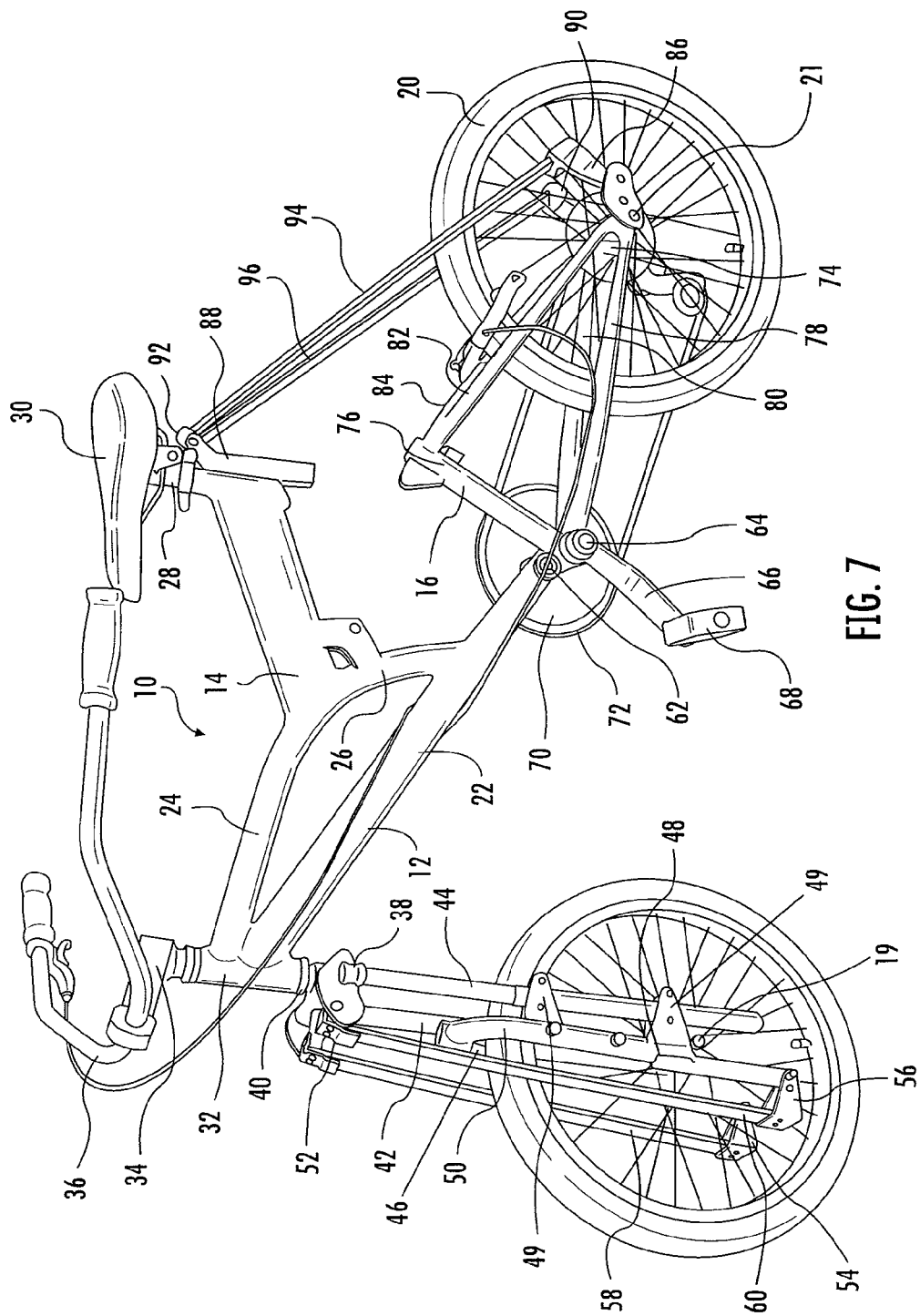
FIG. 7 is a side perspective view of an alternate embodiment of a bow assisted jumping bicycle.

In the preferred embodiment, shown in FIGS. 4-6, an upper fork bracket (52) is attached below the head tube (32) which connects to the upper ends of the right and left front springs (58, 60), and connects to a right slideable fork tube (102) and a left slideable fork tube (104). The right and left slideable fork tubes (102, 104) extend downward and into a base arc (100). The base arc (100) is predominantly shaped as an upside down "U," where the bottom extensions are the lower right and left tubes, which connect to the front axle (19), and the upper connection provides structural support and stability to the fork (38). On each side of the base arc (100), in the bottom extensions, is a hollow section forming a housing for each slideable fork tube. At the lower end of the bottom extensions of the base arc (100) is a right and left front bracket (54, 56). The right and left front springs (58, 60) extend from the upper fork bracket (52) to the right and left front brackets (54, 56). As the force on the front wheel (18) increases, the wheel is able to move towards the handlebars (36) of the bicycle (10), with the slideable fork tubes (102, 104) entering the base arc (100) causing the right and left front springs (58, 60) to store energy for a jump.

In the preferred embodiment, the right front spring (58) and the left front spring (60) are bow springs. Because of their spring properties and relatively light overall weight, it is preferable to make the bow springs of fiberglass/epoxy, graphite/epoxy, or fiberglass/nylon. Optimal use of bow springs in any of the embodiments requires the bracket on the top and bottom of the spring need to allow the bow to pivot about the connection. The connection of the bow springs to the brackets can be seen in FIGS. 5 and 6. In the preferred embodiment, the bow springs are attached at the upper fork bracket (52) so that the bow spring is approximately 0.75 in from the pivot joint and attached approximately 2 in from the pivot joint at the bottom end at the right and left front brackets (54, 56), however alternate spacing between the bow springs and the bracket will also work.

The rear wheel of the bicycle is held by the left and right chain stays (78, 80) and the left and right seat stays (82, 84). The chain stays (78, 80) extend out from where the pedal axle (64) is housed within the frame (12). The seat stays (82, 84) extend down from the upper end of the seat tube (76) to add support to the frame (12) to hold the rear wheel (20). The seat and chain stays attach to the rear wheel (20) at the rear axle (21). In the embodiments illustrated in FIG. 6, a left rear wheel bracket (86) and a right rear wheel bracket (90) are attached. The left rear spring (94) is attached on a lower end to a left rear wheel bracket (86), which is attached at the rear axle (21), and extends up and attaches on an upper end to a left seat bracket (88) attached to the seat post (28). The right rear spring (96) is attached on a lower end to a right rear wheel bracket (90) and extend up and attaches on an upper end to a right seat bracket (92), also attached to the seat post (28). As in the front the rear springs (94, 96) are bow springs, and the springs store energy as the frame hinge (62) allows the frame to contract bringing the seat brackets (88, 92) closer to the rear wheel brackets (86, 90).

The preferred rear spring, as seen in FIG. 1, a longer than normal coil spring is used between the front section (14) and rear section (16) of the bicycle frame (12). This coil spring (98) will generally be in the range of 6 in. to 12 in. in uncompressed length to allow for enough compression and expansion as the bicycle (10) stores energy and releases it as a jump. Additionally, as seen in the figures, the frame (12) is in two pieces and the front section (14) and the rear section (16) only connect at the hinge (62) and the rear coil spring (98). The two sections of the frame (12) don't need to be disconnected, but it is important that the two sections be able to move as the springs flex, as any friction or restriction of movement of the frame (12) will hinder the ability of the springs to store and release the energy necessary to make the bicycle (10) jump.

In operation, the spring assisted jumping bicycle (10) can operate similarly to a normal bicycle. A rider can pedal the bicycle for efficient transportation by alternately pressing the pedals (68) which causes the chain ring (70) to turn the chain (72) which turns the rear cog (74), and in turn the rear wheel (20) producing forward motion through friction between the rear wheel (20) and the ground. When a rider wants to start jumping they need to "pump" the bike by dropping their center of gravity while pressing down on the pedals (68) and the handlebars (36) causing the bike's center of gravity to drop. The drop in the center of gravity for the system causes a drop in ground potential energy; the energy change stores in the springs as spring potential energy. Once the energy is stored, a rider releases the downward pressure on the bicycle causing the springs to release the stored energy resulting in the bike "springing" back up. A rider can "pump" the bike in order to make the bike jump while moving or while still. Additionally, a rider can ride off of an elevated surface to create a larger drop in ground potential energy resulting in greater spring potential energy and a greater jump.

While the present invention discloses a complete bicycle, many different bicycle frames exist in the market which can be adapted for spring assisted jumping. Most bicycle frames which have a hinge allowing the rear part of the bicycle frame to flex downward when downward force is applied can be converted into a jumping bicycle with the disclosed fork and a rear spring and bracketing system. Additionally, differing handlebars and pedal combination set-ups can be utilized for optimal performance. Shown in the figures is an elongated handlebar used with standard pedals. This combination allows a rider to stay centered over the pedals so that the rider's feet stay in contact with the pedals while in the air. Alternatively, the use of pedal clips, or clip less pedals, can help a rider maintain contact with the pedals during a jump. Using a system to maintain contact between a riders's feet and the pedals then allows a rider to use alternate handlebars on the jumping bicycle.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain faun of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A bicycle comprising: a two-piece frame defined by a front end and a rear end, said front end coupled to a front wheel assembly having a front wheel, at least a portion of the front wheel assembly being slidably moveable to permit said front wheel to move vertically in relation to said front end of said frame, said front wheel assembly including a front axle to permit rotation of said front wheel, and said rear end having a pivot attached to said front end and a rotatable rear wheel mounted to said rear end of said frame;

at least one bow spring having an upper end pivotally attached to said front wheel assembly and a lower end pivotally attached to said front wheel assembly, said at least one bow spring bendable to store potential energy when a downward force is applied to said frame; and at least one rear spring located a distance from said pivot, said at least one rear spring having a first end secured to said front end of said frame and a second end secured to said rear end of said frame, said at least one rear spring being compressible and configured to store potential energy when a downward force is applied to said frame;

wherein a downward force applied on said front and rear ends of said frame induces said at least one bow spring and at least one rear spring to store potential energy, whereby removal of the downward force on said front and rear ends of said frame results in a release of said potential energy and propels said frame vertical such that said bicycle jumps into the air.

2. The bicycle according to claim 1, wherein said front wheel assembly includes a steering fork having an upper end coupled to said front end of said frame and a lower end juxtaposed to said front axle, a front axle mount bracket for securing said front wheel and said lower end of said at least one bow spring to said steering fork, said front axle mount bracket being movable along a length of said steering fork, and said upper end of said at least one bow spring being pivotally attached to said upper end of said steering fork and said lower end of said at least one bow spring being pivotally attached to said front axle mount bracket.

3. The bicycle according to claim 1, wherein said front wheel assembly includes an extendable steering fork having an upper end coupled to said front end of said frame and a lower end coupled to said front axle, said steering fork including an upper bracket, a left front bracket coupled to said front axle on a left side of said front axle, a right front bracket coupled to said front axle on a right side of said front axle, a left inner cylinder, a left outer cylinder, a right inner cylinder, a right outer cylinder, wherein said right inner cylinder and said right outer cylinder are slidably coupled with each other and said left inner cylinder and said left outer cylinder are slidably coupled with each other, and wherein said at least one bow spring comprises a left front bow spring and a right front bow spring, wherein a lower end of said left front bow spring is mechanically coupled to said left front bracket and an upper end of said left front bow spring is mechanically coupled to said upper bracket and a lower end of said right front bow spring is mechanically coupled to said right front bracket and an upper end of said right front bow spring is mechanically coupled to said upper bracket.

4. The bicycle according to claim 1, wherein said at least one bow spring is made of fiberglass/epoxy material.

5. The bicycle according to claim 1, wherein said at least one bow spring is made of graphite/epoxy material.

6. The bicycle according to claim 1, wherein said at least one bow spring is made of fiberglass/nylon material.

7. The bicycle according to claim 1, wherein said at least one rear spring comprises a steel coil spring that is greater than 6 inches in length and less than 12 inches in length.

8. The bicycle according to claim 1, wherein said front wheel assembly includes a left fork tube and a right fork tube, a left and a right lower tube and a support arc, at least one left roller, at least one right roller, at least one left roller bracket and at least one right roller bracket, said left and right fork tubes each having a top end and a bottom end, said top ends of said left and right fork tubes attached to a top spring bracket, said right and left lower tubes having a top end secured to said support arc and each having a lower end attached to a lower spring bracket, said at least one left roller secured within said at least one left roller bracket, said at least one left roller bracket secured to said left lower tube and configured to slidably connect said left lower tube to said left fork tube, said at least one right roller secured within said at least one right roller bracket, said at least one right roller bracket secured to said right lower tube and configured to slidably connect said right lower tube to said right fork tube.

9. The bicycle according to claim 1, wherein said at least one rear spring comprises a left rear spring and a right rear spring each having a first end and a second end, wherein said second end of said left rear spring is coupled to a left rear wheel bracket mounted on said rear end of said frame and said first end of said left rear spring is coupled to a left seat bracket mounted on said front end of said frame, and wherein said second end of said right rear spring is coupled to a right rear wheel bracket mounted on said rear end of said frame and said first end of said right rear spring is coupled to a right seat bracket mounted on said front end of said frame.

10. The bicycle according to claim 9, wherein said left and right rear springs are bow springs.

11. A bicycle fork configured to be attached to a bicycle, the bicycle fork comprising: a steering tube having a top end and a bottom end; an upper bracket coupled to the bottom end of said steering tube; a right tube and a left tube each having a top end and a bottom end, said top end of said right and left tubes connected to said upper bracket; a U-shaped base arc having a right lower housing, a left lower housing and a top arc connecting said right and left lower housings, said bottom ends of said right and left tubes slidably connected to said right lower housing and said left lower housing, respectively, such that said right and left tubes are slidable within said right and left lower housings; a right bracket coupled to said right lower housing, a left bracket coupled to said left lower housing; at least one bow spring having at least a portion thereof disposed outside of and adjacent to said right and left tubes, said at least one bow spring having an upper end and a lower end, said lower end of said at least one bow spring connected to one of said right and left brackets, said upper end of said at least one bow spring connected to said upper bracket, and said at least one bow spring being bendable and configured to store energy when compressed and return stored energy to said bicycle fork when uncompressed, such that a bicycle, to which the bicycle fork is configured to be attached, is capable of being propelled vertically to lump into the air.

12. The bicycle fork according to claim 11, wherein said at least one bow spring comprises two bow springs, wherein said lower end of each of said bow springs is pivotally connected to said right bracket and said left bracket, respectively, and said upper end of each of said bow springs is pivotally connected to said upper bracket.

13. The bicycle fork according to claim 11, wherein said at least one bow spring is made of fiberglass/epoxy material.

14. The bicycle fork according to claim 11, wherein said at least one bow spring is made of graphite/epoxy material.

15. The bicycle fork according to claim 11, wherein said at least one bow spring is made of fiberglass/nylon material.

* * * * *